United States Patent [19]

Ishikawa

[11] Patent Number: 5,095,366
[45] Date of Patent: Mar. 10, 1992

[54] VIDEO SIGNAL CODING DEVICE AND DECODING DEVICE UTILIZING PLURAL QUANTIZATION/INVERSE QUANTIZATION

[75] Inventor: Hisashi Ishikawa, Yokohama, Japan

[73] Assignee: Canon Kabushiki Kaisha, Tokyo, Japan

[21] Appl. No.: 515,627

[22] Filed: Apr. 27, 1990

[30] Foreign Application Priority Data

Apr. 28, 1989 [JP] Japan .................................. 54-109512

[51] Int. Cl.$^5$ .............................................. H04N 7/13
[52] U.S. Cl. ..................................... 358/136; 358/135
[58] Field of Search ............... 358/133, 135, 136, 138; 341/200

[56] References Cited

U.S. PATENT DOCUMENTS

| 4,281,344 | 7/1981 | Mounts et al. ....................... 358/136 |
| 4,725,885 | 2/1988 | Gonzales et al. ..................... 358/135 |
| 4,744,085 | 5/1988 | Fukatsu . | |
| 4,831,636 | 5/1989 | Taniguchi et al. .............. 312/133 X |
| 4,851,906 | 7/1989 | Koga et al. ....................... 358/136 X |
| 4,903,124 | 2/1990 | Hoshi et al. . | |
| 4,995,059 | 2/1991 | Ishikawa . | |

Primary Examiner—Victor R. Kostak
Attorney, Agent, or Firm—Fitzpatrick, Cella, Harper & Scinto

[57] ABSTRACT

In an apparatus for encoding a video signal having correlation between picture frames, there is provided a coding device for encoding the video signal by sequentially using a plurality of quantizers having quantization characteristics different from one another for every picture frame. When regions of values indicated by a plurality of encoded codes corresponding to an identical picture element in a plurality of picture frame adjacent to one another in time overlap with one another, there is also provided a decoding device having a value in the overlapped region as a decoded value. It becomes thereby possible to provide high picture quality for transmitted signals and to reduce a transmission data rate.

23 Claims, 6 Drawing Sheets

FORMATION CIRCUIT OF
FRAME ID

FIG. 6(a)  FIG. 6(b)  FIG. 6(c)
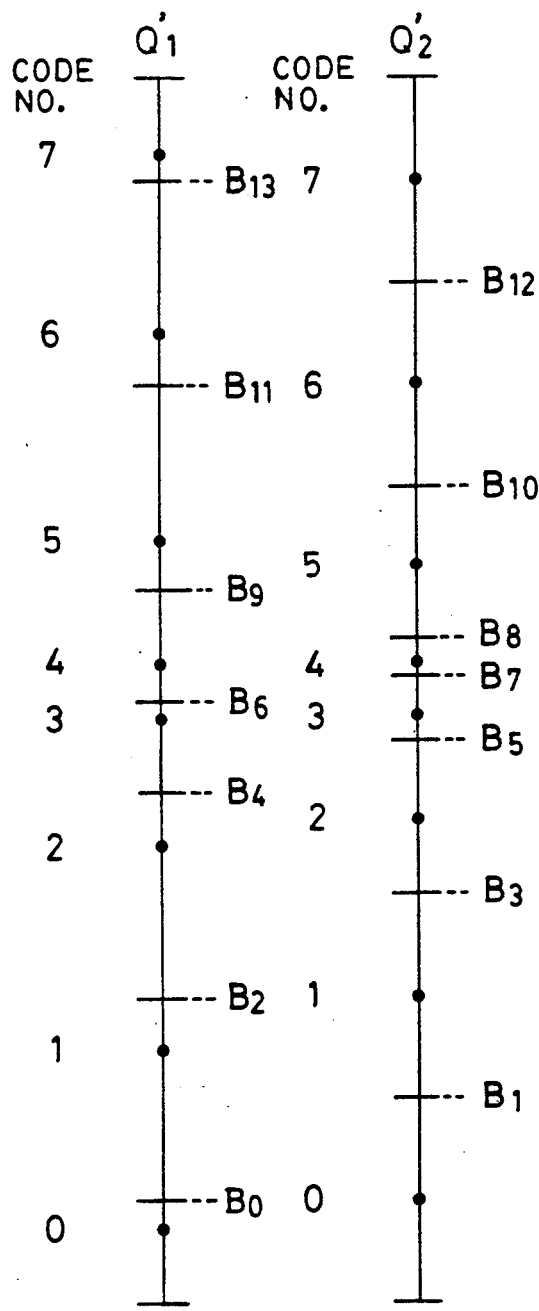
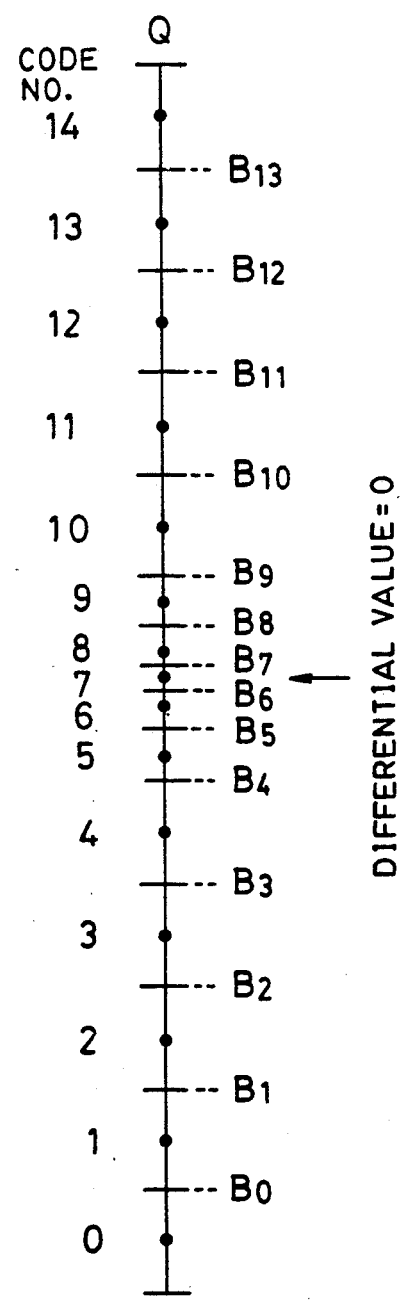

FIG. 7(a)   FIG. 7(b)   FIG. 7(c)
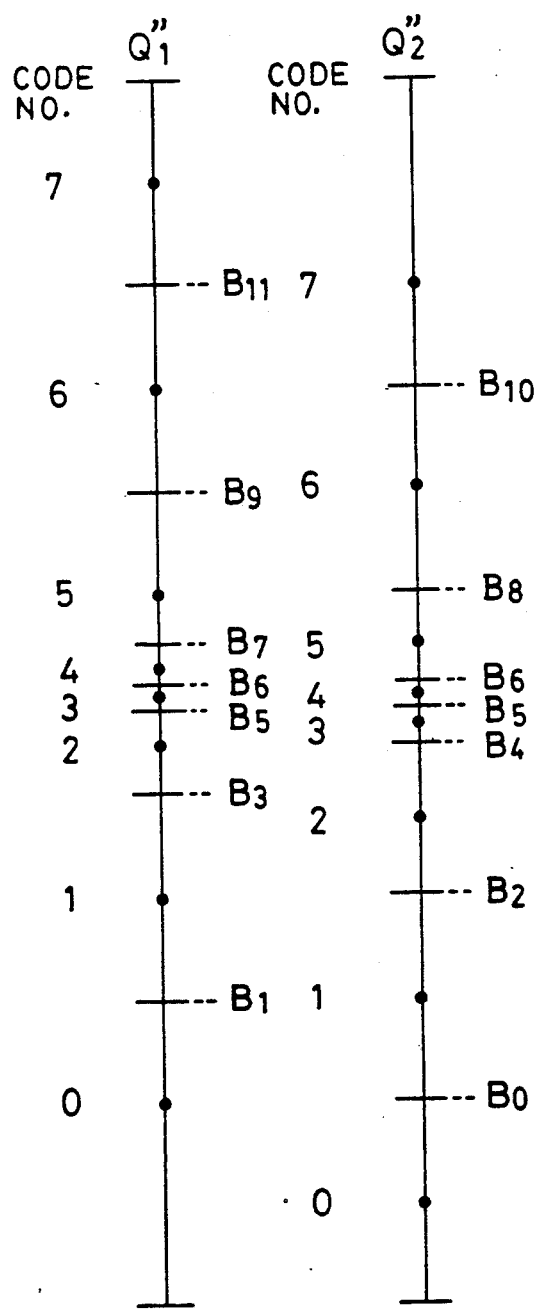
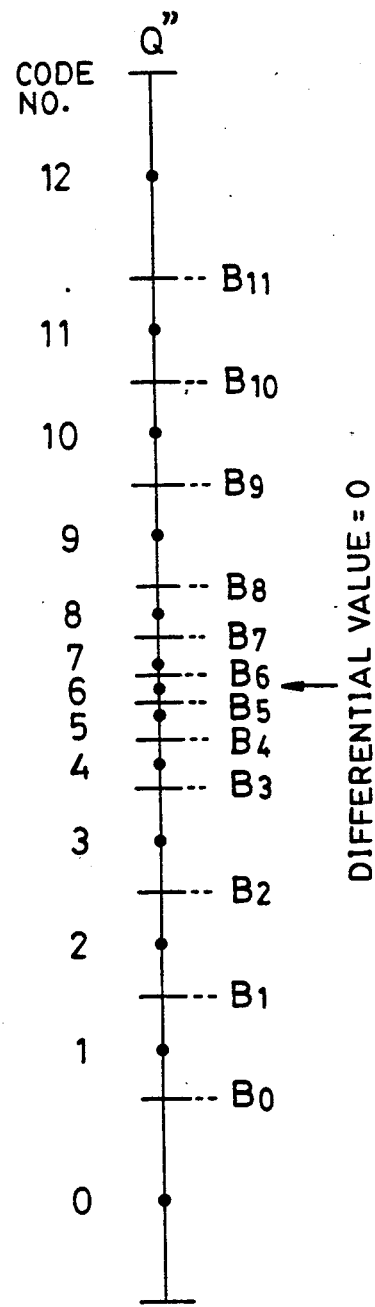

VIDEO SIGNAL CODING DEVICE AND DECODING DEVICE UTILIZING PLURAL QUANTIZATION/INVERSE QUANTIZATION

BACKGROUND OF THE INVENTION

1. Field of the Invention

This invention relates to a video signal coding device and a decoding device, and more particularly, to the reduction of a transmission rate for video signals, and to the provision of high picture quality for transmitted video signals.

2. Description of the Prior Art

Various kinds of encoding methods have been proposed for reducing the amount of transmitted information when image information is transmitted. As one of these methods, predictive coding is known (termed hereinafter a "DPCM") which compresses the amount of information utilizing a correlation between sampled values. In the DPCM method, a predictive value for a sampled value to be subsequently coded is obtained from the decoded value of an already-transmitted sampled value, and a differential value (a predictive error) between the predictive value and the sampled value is quantized and transmitted. For use in the DPCM method, various kinds of methods have been proposed according to the method for producing the predictive value.

FIG. 1 is a block diagram showing the configuration of the most simple coding device using a preceding-value-predictive coding method. The preceding-value-predictive coding method is a method in which the decoded value of a sampled value to be transmitted immediately before the current sampled value is used as a predictive value, and a differential value between the current sampled value and the predictive value (the preceding value) is encoded and transmitted.

In FIG. 1, a sampled value $X_i$ input to an input terminal 10 is supplied to a subtracter 12, where a predictive value (the preceding value), which will be described later, is subtracted from the value $X_i$. A quantizer 14 quantizes a differential value output from the subtracter 12, and outputs an encoded code $Y_i$ to an output terminal 16 for transmission to a transmission channel.

The encoded code $Y_i$ is also supplied to an inverse quantizer 18. The inverse quantizer 18 converts the supplied encoded code $Y_i$ into a differential value (a representative quantized value). The predictive value (to be described later) is added to the representative quantized value in an adder 20, and a value corresponding to the input sampled value is output (this output is hereinafter termed a "restored value"). Since the restored value includes a quantized error, it has the possibility to exceed a range which the original input sampled value may have (this range is termed hereinafter briefly an "encoded range").

Accordingly, the amplitude of the restored value is limited within the encoded range of the original sampled value by a limiter 22, and the resultant value is supplied as a local decoded value $\overline{X}_i$ to a D-type flip-flop 24 which is a predictive unit. In this example, since the decoded value of the preceding value is used as the predictive value, the predictive unit is a D-type flip-flop. The D-type flip-flop 24 supplies the subtracter 12 and the adder 20 with the local decoded value $\overline{X}_i$ as the predictive value at the next clock cycle.

At this moment, the probability distribution of the differential value beween the predictive value and the input sampled value is generally skewed to portions having small absolute values. Hence, it is possible to compress the amount of information by making quantization steps fine in regions where differential values have small absolute values, and by making quantization steps coarse in regions where differential values have large absolute values.

In the example shown in FIG. 1, however, quantization steps are large in portions where predictive errors are large, such as an edge portion of an image, and hence quantization errors have very large values. Particularly at a level near a quantization boundary value (a threshold value between adjacent quantized codes) of a quantizer in a region where a predictive error is large, a representative quantized value changes with time even in a still-picture portion due to noise and the like. Accordingly, this small change in value results in a large change in value, which causes a large deterioration in picture quality. Such a deterioration in picture quality is particularly pronounced at an edge portion of an image where a predictive error is large, and is named "edge business" because the values of picture elements near an edge change with time.

Such a problem is not peculiar to the DPCM method, as described above, but is a problem which generally occurs in all coding systems having coarse quantization steps.

SUMMARY OF THE INVENTION

It is an object of the present invention to solve the problems described above.

It is another object of the present invention to provide a novel video signal coding device capable of effectively reducing deterioration in an image caused by coarse quantization steps without increasing a data rate for transmission.

These and other objects are accomplished, according to one aspect of the present invention, by a video signal coding device comprising an input unit for inputting a sampled value provided by sampling a video signal having correlation between picture frames, a plurality of quantization means having quantization characteristics different from one another, and for quantizing a value to be quantized relating to the sampled value, and selection means for selectively outputting a plurality of encoded codes, which the plurality of quantization means output in parallel, in units of a picture frame.

According to another aspect, the present invention relates to a decoding device for decoding an encoded code quantized according to one of a plurality of quantization characteristics which are different from one another, the device comprising inverse quantization means for inputting the encoded code, for a plurality of the encoded codes for picture elements at an identical position in a plurality of picture frames which are close in time base, when regions of values corresponding to the respective encoded codes do not overlap with one another, the inverse quantization means outputting one of a plurality of representative quantized values according to inverse quantization characteristics corresponding to the plurality of quantization characteristics, and for the plurality of encoded codes for picture elements at an identical position in a plurality of picture frames which are close in the time base, when regions of values corresponding to the respective encoded codes overlap with one another, the inverse quantization means being capable of outputting a composite representative value which has a value within the overlapped region and different from the plurality of representative quantized values.

In the video signal coding device as described above, since quantization is performed by quantization characteristics which are different for every picture frame, the number of quantization levels for an identical picture element relative to a plurality of picture frames continuing in the time base increases. Particularly, if the boundary values in quantization characteristics of a plurality of quantizers are arranged so as to be different from one another except at ends of a quantization range, the number of quantization levels increases plural times.

By thus increasing the number of quantization levels, it is possible to suppress quantization errors to small values and to minimize deterioration in picture quality by the operation of codes only at the decoding side.

For example, when image information encoded sequentially using a plurality of quantizers having different quantization characteristics is decoded as in the above-described decoding device, if regions of the corresponding values overlap with one another for a plurality of codes corresponding to an identical picture element relative to a plurality of picture frames adjacent in the time base, by making the representative quantized value for at least one code among the plurality of codes become a value in the overlapped area, it is possible to decode an image with an accuracy equal to that when new quantization levels having small widths of quantization steps are set at least at a still-picture portion by the cooperation of the plurality of quantizers. Hence, it becomes possible to provide extremely accurate image information.

These and other objects and features of the present invention will become more apparent from the following detailed description of the present invention given with reference to the accompanying drawings.

BRIEF DESCRIPTION OF THE DRAWINGS

FIGS. 6 and 7, each composed of FIGS. 6(a)–6(c) and 7(a)–7(c), are diagrams showing other examples of quantization characteristics in the embodiments shown in FIGS. 2–4.

DETAILED DESCRIPTION OF THE PREFERRED EMBODIMENTS

Embodiments of the present invention will now be explained.

Figure 1:
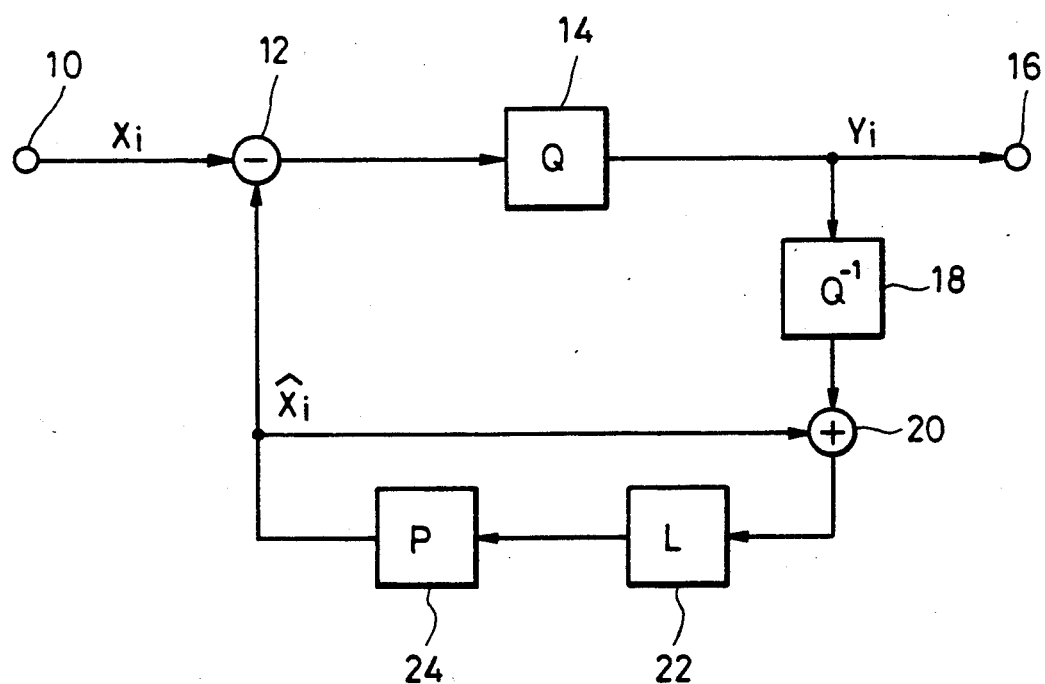
FIG. 1 is a diagram showing an example of the configuration of a conventional coding device.
Figure 2:
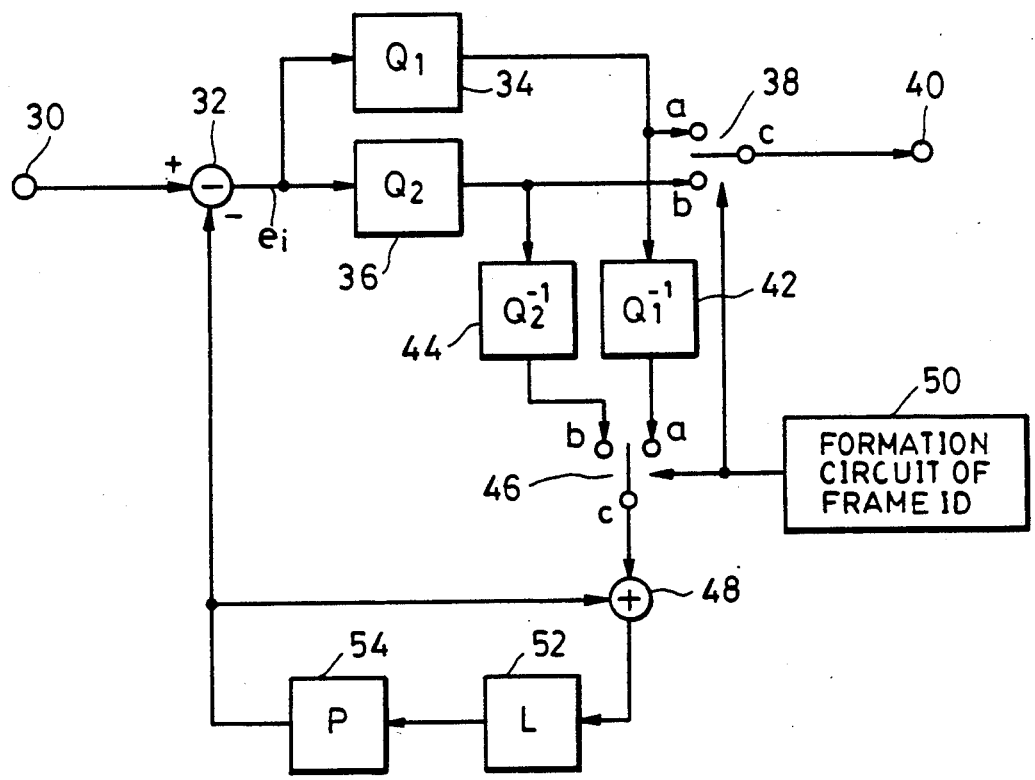
FIG. 2 is a block diagram showing the configuration of a coding device according to an embodiment of the present invention.

FIG. 2 is a block diagram showing the configuration of a coding device according to an embodiment of the present invention. In FIG. 2, there are shown an input terminal 30, a subtracter 32, quantizers 34 and 36, switches 38 and 46 for switching signals, an output terminal 40 for encoded codes, inverse quantizers 42 and 44, an adder 48, a formation circuit 50 for frame ID signals, a limiter 52, and a predictive unit 54.

A predictive value is subtracted from an input sampled value input from the input terminal 30 by the subtracter 32 to provide a differential value (a predictive error) $e_i$, which is converted into encoded codes by the quantizers 34 and 36. The encoded code converted by the quantizer ($Q_1$) 34 is supplied to terminal "a" of the switch 38 and the inverse quantizer ($Q_1^{-1}$) 42, converted into a representative quantized value by the inverse quantizer ($Q_1^{-1}$) 42, and is supplied to terminal "a" of the switch 46. On the other hand, the encoded code converted by the quantizer ($Q_2$) 36 is supplied to terminal "b" of the switch 38 and the inverse quantizer ($Q_2^{-1}$) 44, is converted into a representative quantized value by the inverse quantizer ($Q_2^{-1}$) 44, and is supplied to terminal "b" of the switch 46.

The switches 38 and 46 connect, for example, terminal "a" for an even frame and terminal "b" for an odd frame to common terminal "c", in accordance with a frame ID signal formed by a frame ID formation circuit 50 in synchronization with a sampled value input from the input terminal 30. The encoded code selected by the switch 38 is output from the output terminal 40 to a transmission channel. The frame ID signal is also output to the transmission channel so as to coincide with the selected code at a transmission side (a coding unit) and a receiving side (a decoding unit) of the apparatus.

The predictive value is added to the representative quantized value selected by the switch 46 by the adder 48, and a restored value of the input sampled value is obtained. The amplitude of the restored value is limited within the encoded range of the input sampled value by the limiter (L) 52, and is supplied to the predictive unit (P) 54 as a local decoded value. The predictive unit (P) 54 generates a predictive value for the next input sampled value from the local decoded value, and supplies the predictive value to the subtracter 32 at the next clock cycle.

Figure 3:
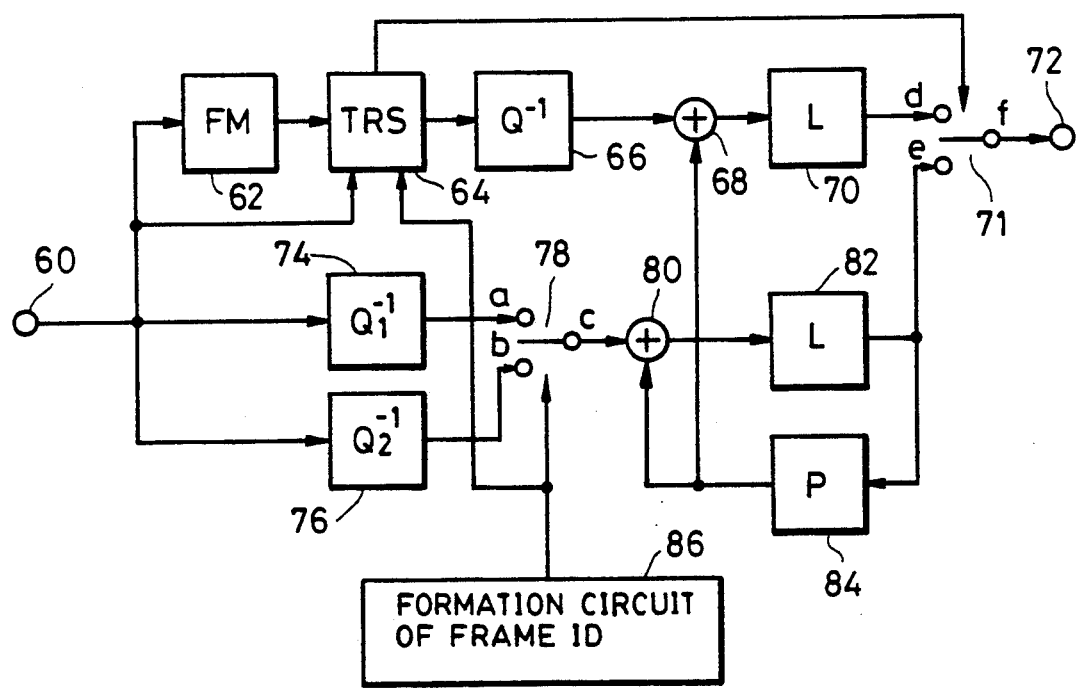
FIG. 3 is a block diagram showing the configuration of a decoding device according to an embodiment of the present invention.

FIG. 3 is a block diagram showing the configuration of a decoding device according to an embodiment of the present invention. The decoding device decodes codes encoded by the coding device shown in FIG. 2.

In FIG. 3, there are shown an input terminal 60 for receiving encoded codes, a frame memory (FM) 62, an encoded-code transformation circuit (TRS) 64, inverse quantizers 66, 74 and 76, adders 68 and 80, limiters (L) 70 and 82, an output terminal 72 for outputting decoded values, switches 71 and 78 for switching signals, a predictive unit (P) 84, and a formation circuit 86 for forming a frame ID signal in synchronism with a decoded video signal.

An encoded code input from the input terminal 60 is supplied to the inverse quantizers ($Q_1^{-1}$ and $Q_2^{-1}$) 74 and 76, is transformed into representative quantized values, which are supplied to terminal "a" and terminal "b" of the switch 78, respectively. The switch 78 connects, for example, terminal "a" for an even frame and terminal "b" for an odd frame to common terminal "c" in accordance with a frame ID signal input from the frame ID formation circuit 86. A predictive value supplied from the predictive unit (P) 84 is added to the representative quantized value selected by the switch 78 by the adder 80. The amplitude of the resultant value is limited within a predetermined coded range by the limiter (L) 82 to become a decoded value, which is supplied to the predictive unit (P) 84 and terminal "e" of the switch 71. As in the case of the above-described coding device, the predictive unit (P) 84 generates the predictive value for the next picture element from the decoded value, and supplies the adder 80 with the predictive value at the next clock cycle.

The encoded code is also supplied to the frame memory (FM) 62 and the encoded-code transformation circuit 64. The frame memory (FM) 62 delays the encoded code for a period of one frame, and supplies it to the encoded code transformation circuit (TRS) 64. The encoded code transformation circuit (TRS) 64 estimates the range of an input differential value using the encoded code for the preceding frame, the encoded code for the current frame and the above-described frame ID signal.

Suppose that the range of values of the input differential value $\epsilon^{n-1}$ for the preceding frame indicated by the encoded code for the preceding frame is ($\epsilon_1 \leq \epsilon^{n-1} \leq \epsilon_2$), and the range of values of the input differential value $\epsilon^n$ indicated by the encoded code for the current frame is ($\epsilon_3 \leq \epsilon^n \leq \epsilon_4$). At this time, if there is an overlapped region in the ranges of these two input differential values, it is possible to estimate that the input differential value exists in the ovelapped region.

Suppose that the range of the estimated value $\epsilon$ for the input differential value is ($\epsilon_3 \leq \epsilon \leq \epsilon_2$) when ($\epsilon_1 \leq \epsilon_3 \leq \epsilon_2 \leq \epsilon_4$), and that the range of the estimated value for the input differential value is ($\epsilon_1 \leq \epsilon \leq \epsilon_4$) when ($\epsilon_3 \leq \epsilon_1 \leq \epsilon_4 \leq \epsilon_2$). The encoded code transformation circuit 64 supplies the inverse quantizer ($Q^{-1}$) 66 with the code indicating the range of the estimated value $\epsilon$ for the input differential value. The inverse quantizer 66 outputs the differential value (the representative quantized value) set in the above-described overlapped region in accordance with the code supplied from the encoded code transformation circuit 64. The predictive value obtained from the predictive unit (P) 84 is added to the differential value obtained from the inverse quantizer 66 by the adder 68. The amplitude of the resultant value is limited within a predetermined coded range by the limiter (L) 70, and a decoded value is obtained. The decoded value from the limiter (L) 70 is supplied to terminal "d" of the switch 71.

On the other hand, when there is no overlapped region, it is determined that the image in this portion is a moving picture, and a decoded value produced by a normal decoding operation is output without modification.

That is, the switch 71 selects the decoded value supplied to terminal "d" when there is an overlapped region in the range of the input differential value between the encoded codes for the actual frame and the immediately preceding frame, and selects the decoded value supplied to terminal "e" when there is no overlapped region, in accordance with a control signal supplied from the encoded code transformation circuit (TRS) 64. The selected decoded value is output from the terminal 72 as the decoded value.

Figures 5A, 5B, 5C:
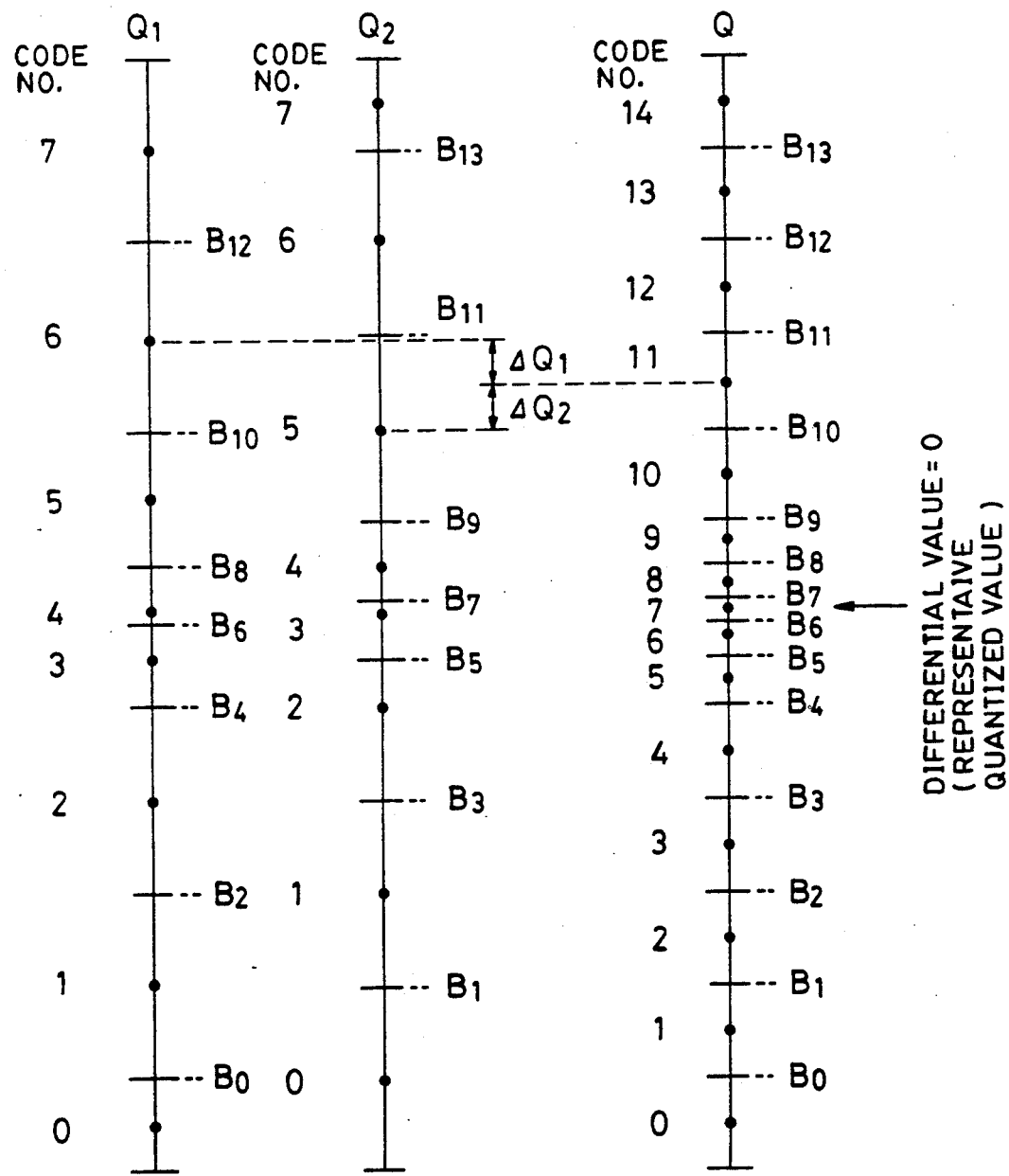
FIG. 5, composed of FIGS. 5(a)–5(c), are diagrams showing examples of quantization characteristics in the embodiments shown in FIGS. 2–4.

Next, a more detailed operation of the decoding device of the present embodiment will be explained. FIG. 5, composed of FIGS. 5(a) and 5(b), depicts diagrams showing examples of quantization characteristics $Q_1$ and $Q_2$ corresponding to the inverse quantizers ($Q_1^{-1}$ and $Q_2^{-1}$) 74 and 76 shown in FIG. 3, respectively, and a synthesized quantization characteristic Q corresponding to the inverse quantizer ($Q^{-1}$) 66.

In FIG. 5, horizontal lines indicate boundary values for encoded codes, and black circles indicate representative quantized values. As shown in FIG. 5, boundary values of the quantization characteristics $Q_1$ and $Q_2$ have structures in which boundary values in the quantization characteristic Q are alternately disposed. When the encoded code according to the quantization characteristic $Q_1$ for the preceding frame is "5", and the encoded code according to the quantization characteristic $Q_2$ for the current frame is "5", the encoded code transformation circuit (TRS) 64 estimates the overlapped region of the ranges of the input differential values immediately before quantization indicated by the two encoded codes, that is, the range indicated by code "10" of the quantization characteristic Q as the range of the input differential value, and supplies this code "10" to the inverse quantizer ($Q^{-1}$) 66. The inverse quantizer ($Q^{-1}$) 66 outputs a value within the range indicated by the above-described code as the representative quantized value. When the encoded code according to the quantization characteristic $Q_1$ for the preceding frame is "2", and the encoded code according to the quantization characteristic $Q_2$ for the current frame is "5", since there is no overlapped region in the ranges of the input differential values, a decoding operation according to the encoded code "5" of the current frame (that is, a decoding operation according to the quantization characteristic $Q_1$ or $Q_2$) is performed.

If it is assumed that the number of representative quantized values before the change is M, then the number of representative quantized values after being changed by the above-described operation becomes (2M − 1) at the maximum value, which is nearly equivalent to the increase of the number of quantized bits by one bit in a stationary portion having high frame correlation. Since no operation is performed at a moving-picture portion having low frame correlation, no deterioration is produced. Furthermore, since a decoded value used for the generation of a predictive value is made to coincide with a decoded value in the coding device, no mismatching is produced between the coding side and the decoding side. When the input differential value is in the range indicated by code "9" according to the quantization characteristic Q shown in FIG. 5(c) for the preceding frame, and is in the range indicated by code "11" according to the quantization characteristic Q shown in FIG. 5(c) for the current frame, encoded codes when the preceding frame and the current frame are encoded according to the quantization characteristic $Q_1$ shown in FIG. 5(a) and the quantization characteristic $Q_2$ shown in FIG. 5(b), respectively, both become "5", and the output representative quantized value is changed to the value of code "10" shown in FIG. 5(c). However, the range of code "10" shown in FIG. 5(c) is within the range of code "5" in the quantization characteristic $Q_2$ shown in FIG. 5(b), which is within the range of the quantization error due to the quantization characteristic $Q_2$ shown in FIG. 5(b). Hence, there is little adverse effect on picture quality. Furthermore, since a portion where such an error is produced is a moving-picture portion, it can be said that there is no adverse effect taking into consideration visual characteristics of the human observer.

In the above-described configuration shown in FIG. 3, if the quantization characteristics explained with reference to FIG. 5 are applied, the inverse quantizer ($Q^{-1}$) 66 may output all the representative quantized values of the inverse quantizers ($Q_1^{-1}$ and $Q_2^{-1}$) 74 and 76. In this case, it is possible to have a configuration in which the switches 71 and the like are omitted, and the inverse quantizer 66 outputs a representative quantized value in any case.

In the example shown in FIG. 5, boundary values $B_0$-$B_{13}$ in the quantization characteristic Q shown in FIG. 5(c) are alternately allocated to the quantization characteristics $Q_1$ and $Q_2$. The representative quantized values may have any values within the respective boundary values. In the example shown in FIG. 5, however, both $Q_1$ and $Q_2$ have 0 as representative quantized values, taking into consideration that the frequency for the generation of the differential values of zero is high even in a moving-picture portion.

FIGS. 6 and 7, each composed of FIGS. 6(a)-6(c) and 7(a)-7(c), respectively, are diagrams showing other examples of setting a plurality of quantization characteristics. FIGS. 6(a) and 7(a) show quantization characteristics $Q'_1$ and $Q''_1$ corresponding to the inverse quantizer ($Q_1^{-1}$) 74 shown in FIG. 3. FIGS. 6(b) and 7(b) show quantization characteristics $Q'_2$ and $Q''_2$ corresponding to the inverse quantizer ($Q_2^{-1}$) 76 shown in FIG. 3. FIGS. 6(c) and 7(c) show synthesized quantization characteristics $Q'$ and $Q''$ corresponding to the inverse quantizer ($Q^{-1}$) 66 shown in FIG. 3.

In the example shown in FIG. 6, the order of the allocation of boundary values is reversed in the midsection, and representative quantized values in the quantization characteristics $Q'_1$ and $Q''_2$ are made symmetrical in positive and negative directions. For example, $Q'_1$ progresses from $B_6$ to $B_9$ while $Q'_2$ progresses from $B_7$ to $B_8$; and code No. 1 in $Q'_1$ is below code No. 1 in $Q'_2$ while code No. 7 in $Q'_1$ is above code No. 7 in $Q'_2$. By thus setting the quantization characteristics, the capacity of ROM's in the inverse quantizers ($Q_1^{-1}$ and $Q_2^{-1}$) 74 and 76 is reduced. Furthermore, since the quantization characteristics are symmetrical in positive and negative directions, phase characteristics accompanying encoding and decoding operations are improved.

FIG. 7 shows an example in which the quantization characteristics $Q''_1$ and $Q''_2$ have different boundary values at portions having large absolute values of differential values and are alternately disposed, and the quantization characteristics $Q''_1$ and $Q''_2$ have common values (e.g., $B_5$ and $B_6$) at portions having small absolute values of differential values. In this case, the number of representative quantized values in the synthesized quantization characteristic $Q''$, that is, the number of representative quantized values in a still-picture portion decreases. However, since the characteristics near the differential value of zero which have high occurrence frequency become common for the quantization characteristics $Q''_1$, $Q''_2$ and $Q''$, a difference in picture quality between a still-picture portion and a moving-picture portion becomes small, and hence unnaturalness in an image due to a difference in processing becomes small.

Figure 4:
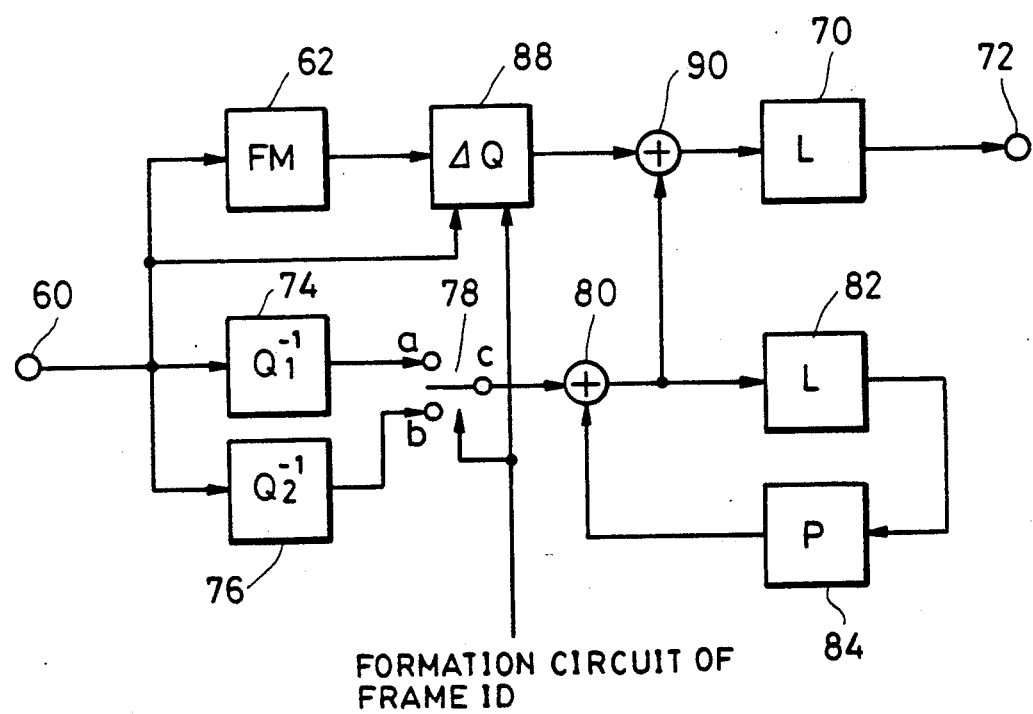
FIG. 4 is a block diagram showing the configuration of a decoding device according to another embodiment of the present invention.

FIG. 4 is a block diagram showing another embodiment of the decoding device of the present invention. In FIG. 4, components having the same functions as those in FIG. 3 are indicated by identical symbols, and an explanation will be provided of only items different from the embodiment shown in FIG. 3.

In FIG. 4, there are shown a correction value generation circuit 88, and an adder 90.

When there is an overlapped region between the range of the input differential value indicated by the encoded code for the preceding frame supplied from the frame memory 62 and the range of the input differential value indicated by the encoded code for the current frame, the correction value generation circuit ($\Delta Q$) 88 supplies the adder 90 with a correction value so that the representative quantized value is within the overlapped region. The adder 90 outputs a decoded value when the representative quantized value is made to be a value within the overlapped region.

For example, if it is assumed that the inverse quantizers ($Q_1^{-1}$ and $Q_2^{-1}$) 74 and 76 have characteristics corresponding to the quantization characteristics $Q_1$ and $Q_2$ shown in FIG. 5, the encoded code for the preceding frame is "6" in the quantization characteristic $Q_1$ and the encoded code for the current frame is "5" in the quantization characteristic $Q_2$, the overlapped region is the range shown by code "11" in the quantization characteristic Q. In this case, the differential value $\Delta Q_2$ between the representative quantized value of code "11" in the quantization characteristic Q and the representataive quantized value of code "5" in the quantization characteristic $Q_2$ is output from the correction value generation circuit 88. The encoded code for the next frame is in the range indicated by code "11" in the quantization characteristic Q. If the next frame is made the current frame, the encoded code for the preceding frame becomes "5" in the quantization characteristic $Q_2$, and the encoded code for the current frame becomes "6" in the quantization characteristic $Q_1$. In this case, the differential value $\Delta Q_2$ between the prepresentative quantized value of code "6" in the quantization characteristic $Q_1$, which is the representative quantized value for the current frame, and the representative quantized value of code "11" in the quantization characteristic Q is output from the correction value generation circuit 88.

On the other hand, if there is no overlapped region, the correction value generation circuit 88 outputs a value corresponding to 0. A value identical to a normal decoded value is thereby output from the output terminal 72.

In the embodiment shown in FIG. 4, the switch 71 in the embodiment shown in FIG. 3 becomes unnecessary, and the capacity of hardware is reduced. The correction value generation circuit 88 may be constituted by a ROM which has previously stored each correction value in an address indicated by two encoded codes and a frame ID signal.

Although, in the above description, an explanation has been provided of only a configuration in which an encoding operation is performed alternately using two quantizers having quantization characteristics different from each other for every frame, the present invention is not limited to this configuration, but the same effects may in general be obtained by a configuration in which an encoding operation of image information is performed sequentially using N (N is an integer greater than or equal to 2) quantizers having quantization characteristics different from one another for every frame. In this case, if the number of representative quantized values in the quantization characteristic of each quantizer is represented by M, the number of representative quantized values in the synthesized quantization characteristic becomes $\{(M-1) \times N + 1\}$ at the maximum. By providing a large number for N, it is possible to improve picture quality in the case of gentle movement. In addition, since the number of adaptive processes is increased, unnaturalness in connection between a moving picture and a still picture is further improved.

As explained above, according to the coding device and the decoding device of the present invention, it is possible to effectively reduce deterioration in picture quality accompanying the roughness of quantization steps without increasing the number of bits of each code.

The individual components shown in outline or designated by blocks in the Drawings are all well known in the video signal coding and decoding arts, and their specific construction and operation is not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video signal coding device comprising:
   an input unit for inputting sampled values provided by sampling a video signal having correlation between picture frames;
   a plurality of quantization means having quantization characteristics different from one another, for quantizing values to be quantized relating to the sampled values; and
   selection means for selectively outputting a plurality of encoded codes, which said plurality of quantization means output in parallel, in units of a picture frame, the plurality of encoded codes corresponding to the values quantized by said plurality of quantization means, said selection means including means for forming a frame synchronizing signal inverted for every frame in synchronization with the corresponding video signal for the sampled value.

2. A device according to claim 1, wherein said selection means periodically outputs the encoded codes output from said plurality of quantization means by sequentially switching the encoded codes in units of a picture frame.

3. A device according to claim 1, wherein quantization boundary values for said plurality of quantization means are different from one another except at ends of a quantization range.

4. A device according to claim 1, further comprising:
   differential means for calculating a differential value between a sampled value from said input unit and a predictive value, and for supplying said plurality of quantization means with the differential value as a value to be quantized; and
   predictive means for calculating the predictive value using an encoded code selected by said selection means.

5. A device according to claim 4, wherein said predictive means calculates the predictive value using an encoded code corresponding to a sampled value in the same picture frame as a sampled value to be predicted.

6. A device according to claim 4, wherein quantization characteristics of said plurality of quantization means are nonlinear.

7. A device according to claim 6, wherein quantization boundary values of said plurality of quantization means correspond with one another at ends of a quantization range and in regions where the absolute value of the differential value is small, and are different from one another in other regions.

8. A device according to claim 4, wherein said predictive means includes (1) a plurality of inverse quantization means having inverse quantization characteristics corresponding to said plurality of quantization means, for inputting the encoded codes, and (2) switching means for selectively outputting a plurality of representative quantized values which said plurality of inverse quantization means output in parallel.

9. A device according to claim 8, wherein a distribution of the representative quantized values output from each of said plurality of inverse quantization means is symmetrical in positive and negative directions.

10. A video signal coding device comprising:
    (a) first and second quantization means having quantization characteristics different from each other, for quantizing values to be quantized relating to a video signal having correlation between picture frames; and
    (b) selection means for selectively outputting a plurality of encoded codes output from said first and second quantization means for every picture frame, the plurality of encoded codes corresponding to the values quantized by said first and second quantization means, said selection means including means for forming a frame synchronizing signal inverted for every frame in synchronization with said video signal.

11. A device according to claim 10, further comprising:
    an input unit for inputting sampled values sampled from the video signal;
    differential means for calculating a differential value between a sampled value from said input unit and a predictive value, and for supplying said first and second quantization means with the differential value as a value to be quantized; and
    predictive means for calculating the predictive value using an encoded code selected by said selection means.

12. A decoding device for decoding an encoded code generated by encoding a value to be quantized relating to a video signal having correlation between picture frames by alternately using first and second quantization characteristics different from each other for every picture frame, said device comprising:
    (a) first and second inverse quantizers having characteristics corresponding to said first and second quantization characteristics, for inputting the encoded code and providing first and second representative quantized values corresponding thereto; and
    (b) selection means for selectively outputting the first and second representative quantized values output from said first and second inverse quantizers for every picture frame, said selection means including means for forming a frame synchronizing signal inverted for every frame in synchronization with the corresponding video signal for the encoded code.

13. A device according to claim 12, wherein the value to be quantized is a differential value between a sampled value and a predictive value of said video signal, and wherein said device further includes (1) a decoding circuit for calculating decoded values using the representative quantized values output from said selection means and the predictive value, and (2) predictive means for calculating the predictive value using a decoded value.

14. A decoding device for decoding an encoded code generated by quantizing a value to be quantized relating to a video signal by using any one of a plurality of quantization characteristics which are different from one another, said device comprising:

inverse quantization circuitry for inputting the encoded code, and wherein, for a plurality of the encoded codes for picture elements at an identical position in a plurality of picture frames which are close together in time, when regions of values corresponding to the respective encoded codes do not overlap with one another, said inverse quantization circuitry outputs one of a plurality of representative quantized values according to predetermined inverse quantization characteristics corresponding to said plurality of quantization characteristics, and wherein, for a plurality of encoded codes for picture elements at an identical position in a plurality of picture elements which are close together in time, when regions of quantization values corresponding to the respective encoded codes overlap with one another, said inverse quantization circuitry outputs a composite representative value which has a value within the overlapped region and different from the plurality of representative quantized values.

15. A device according to claim 14, wherein the encoded code is obtained by quantizing a differential value between a sampled value and a predictive value of the video signal, and wherein said device further includes (1) decoding means for calculating a decoded value using an output value from said inverse quantization circuitry and a decoding predictive value, and (2) predictive means for calculating the decoding predictive value by using the decoded value.

16. A device according to claim 14, wherein said inverse quantization circuitry includes (1) a plurality of inverse quantizers which have inverse quantization characteristics corresponding to the plurality of quantization characteristics, for outputting the plurality of representative quantized values, (2) a composite inverse quantizer capable of outputting a representative value for each of a plurality of quantization regions divided by quantization boundary values in said plurality of quantization characteristics as the composite representative value, and (3) a switching circuit for selectively outputting the plurality of representative quantized values output from said plurality of inverse quantizers and said plurality of representative values.

17. A device according to claim 14, wherein said inverse quantization circuitry includes (1) a plurality of inverse quantizers which have inverse quantization characteristics corresponding to the plurality of quantization characteristics, for outputting the plurality of representative quantized values, a (2) switching circuit for selectively outputting the plurality of representative quantized value output from said plurality of inverse quantizers, (3) a correction value generation circuit for outputting a correction value corresponding to a value of a difference between a represented value for each of a plurality of quantization regions divided by quantization boundary values in the plurality of quantization characteristics and each of the plurality of representative quantized values, and (4) an addition circuit for adding a representative quantized value output from said switching circuit and said correction value.

18. A decoding device for decoding an encoded code generated by encoding a value to be quantized relating to a video signal having correlation between picture frames by alternately using first and second quantization characteristics different from each other for every picture frame, said device comprising:

inverse quantization circuitry for inputting the encoded code, and wherein, for encoded codes corresponding to picture elements at identical positions in picture frames adjacent to each other in time, when regions of quantization values corresponding to the respective encoded codes do not overlap with one another, said inverse quantization circuitry alternately outputs first and second representative quantized values according to inverse quantization characteristics corresponding to the first and second quantization characteristics for every picture frame, and wherein, for encoded codes corresponding to picture elements at identical positions in picture frames adjacent to each other in time, when regions of quantization values corresponding to the respective encoded values overlap with one another, said inverse quantization circuitry is capable of outputting a third representative quantized value which is a value within the overlapped region and different from the first and second representative quantized values.

19. A decoding device for decoding an encoded code generated by encoding a value to be quantized relating to a video signal having correlation between picture frames by alternately using first and second quantization characteristics different from each other for every picture frame, said device comprising:

(a) first and second inverse quantization means for inputting the encoded code, and for outputting first and second representative quantized values according to inverse quantization characteristics corresponding to the first and second quantization characteristics, respectively;

(b) a composite inverse quantizer capable of outputting a third representative quantized value determined for each of a plurality of quantization regions divided by quantization boundary values in the first and second quantization characteristics as a representative value;

(c) detection means for detecting, for encoded codes corresponding to picture elements at identical positions in picture frames adjacent to each other in time, whether or not regions of quantization values corresponding to the respective encoded codes overlap with each other; and (d) switching means for selectively outputting the first, second and third representative quantized values in accordance with a detection output from said detection means.

20. A device according to claim 19, wherein the encoded code is obtained by quantizing a differential value between a sampled value and a predictive value of said video signal, and wherein said device further includes (1) decoding means for calculating a decoded value using an output value from said switching means and a decoding predictive value, and (2) predictive means for calculating the decoding predictive value by using said decoded value.

21. A device according to claim 20, wherein said switching means includes formation means for forming a frame synchronizing signal which is inverted for every frame in synchronization with the corresponding video signal for said decoded value, and operates according to said frame synchronizing signal and the detection output from said detection means.

22. A decoding device for decoding an encoded code generated by encoding a value to be quantized relating to a video signal having correlation between picture frames by alternately using first and second quantization characteristics different from each other for every picture frame, said device comprising:
(a) first and second inverse quantization means for inputting the encoded code, and for outputting first and second representative quantized values according to inverse quantization characteristics corresponding to the first and second quantization characteristics, respectively;
(b) switching means for selectively outputting the first and second representative quantized values for every picture frame;
(c) correction value generation means for outputting a correction value corresponding to the value of a difference between a representative value for each of a plurality of quantization regions divided by quantization boundary values in the plurality of quantization characteristics and each of the plurality of representative quantized values; and
(d) addition means for adding the correction value to the output from said switching means.

23. A device according to claim 22, wherein the encoded code is obtained by quantizing a differential value between a sampled value and a predictive value of said video signal, and wherein said device further includes (1) decoding means for calculating a decoded value using an output value from said addition means and a decoding predictive value, and (2) predictive mean for calculating the decoding predictive value by using the decoded value.

* * * * *

UNITED STATES PATENT AND TRADEMARK OFFICE
CERTIFICATE OF CORRECTION

PATENT NO. : 5,095,366
DATED : March 10, 1992
INVENTOR(S) : Hisashi ISHIKAWA

It is certified that error appears in the above-identified patent and that said Letters Patent is hereby corrected as shown below:

On the title page:

[57] ABSTRACT
Line 9, "frame" should read --frames--.

[30] Foreign Application Priority Data
Line 1, "Apr. 28, 1989 [JP] Japan 54-109512" should read --Apr. 28, 1989 [JP] Japan 1-109512--.

COLUMN 14:
Line 16, "mean" should read --means--.

FIG. 5:
Sheet 4/6, "REPRESENTAIVE" should read --REPRESENTATIVE--.

Signed and Sealed this

Twenty-ninth Day of June, 1993

Attest:

MICHAEL K. KIRK

Attesting Officer

Acting Commissioner of Patents and Trademarks